H. C. BIETTE.
COOKING UTENSIL.
APPLICATION FILED SEPT. 11, 1920.
1,383,971.
Patented July 5, 1921.
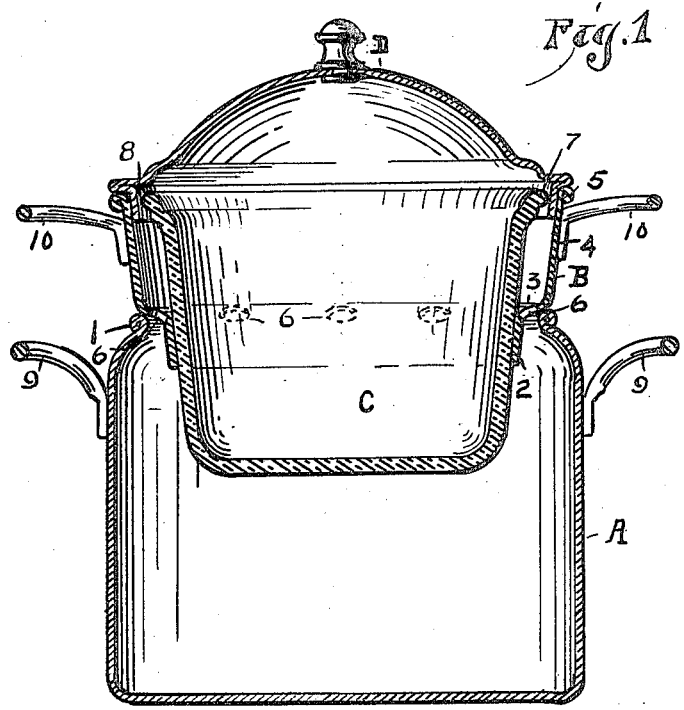
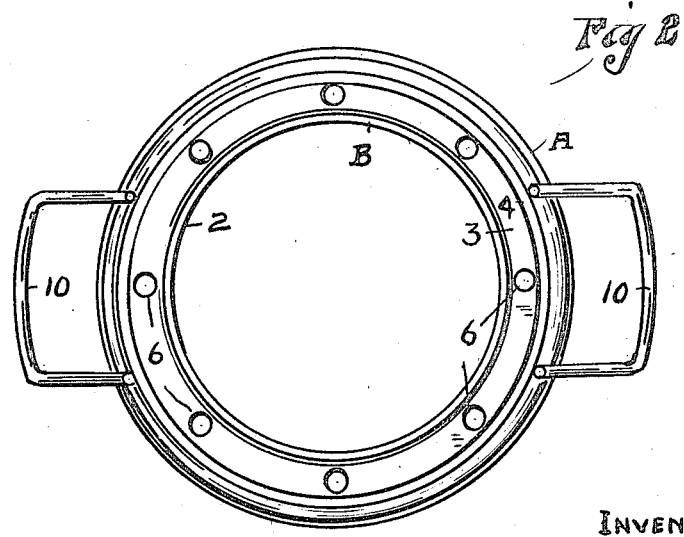
WITNESS
P. F. Dilworth
INVENTOR
Henry C. Biette,
by Edward A. Lawrence
his attorney.

UNITED STATES PATENT OFFICE.

HENRY C. BIETTE, OF PITTSBURGH, PENNSYLVANIA, ASSIGNOR OF ONE-HALF TO J. AUDLEY PIERCE AND ONE-SIXTH TO J. SCOTT JAMISON, BOTH OF McKEESPORT, PENNSYLVANIA.

COOKING UTENSIL.

1,383,971.　　　Specification of Letters Patent.　　Patented July 5, 1921.

Application filed September 11, 1920. Serial No. 409,623.

*To all whom it may concern:*

Be it known that I, HENRY C. BIETTE, a citizen of the United States, and residing in the city of Pittsburgh, in the county of Allegheny and State of Pennsylvania, have invented or discovered the new, useful, and Improved Cooking Utensil, of which the following is a specification.

My invention consists in certain new and useful improvements in cooking utensils and more particularly relates to the type of utensils known as "steamers" or "double boilers" wherein the food to be cooked is contained in an inner vessel suspended in an outer vessel which latter contains water to be heated to the boiling point.

In the case of the utensils of this character now in general use, the upper portions of the inner and outer vessels fit snugly together, the inner vessel being provided with an outwardly extending intermediate flange or bead which rests upon the top edge of the outer vessel to suspend the inner vessel in place.

The result is that the steam cannot gain access to the upper sides of the inner vessel but can only reach the lower sides and bottom of the same, thus requiring a longer period for cooking and a hotter fire, as the upper contents of the inner vessel must be cooked, not by the direct application of steam, but indirectly by the radiation of the heat originally applied to the lower portions of the inner vessel.

Owing largely to this fault, it is necessary to increase the depth of the inner vessel within the steam compartment of the outer vessel, thus increasing the area of the inner vessel directly affected by the steam. Thus, so great a percentage of the steam chamber of the outer vessel is occupied by the depending portion of the inner vessel, that but scanty water capacity is reserved. So, where relatively prolonged cooking is desired, the utensil must be carefully watched or it will boil dry, burning the food and in time ruining the utensil. It is a positive disadvantage to be compelled to replenish the water supply in the outer vessel during the cooking operation, and it results in checking and prolonging the cooking of the food.

The object which I have in view is the provision of a practical cooking utensil of the double boiler type so designed and constructed that the live steam generated in the outer vessel has access to the entire wall surface of the inner vessel, so that the whole contents of the inner vessel are evenly and simultaneously cooked, and sufficient water capacity is provided that there is no danger of the utensil boiling dry within the limits of the usual periods required for the proper treatment of foods.

Generally speaking, I overcome the faults above referred to and obtain the advantageous results mentioned by using what I call a "steam ring" interposed between the outer and inner vessels, said ring being supported by the outer vessel and in turn supporting the inner vessel, an annular steam chamber being formed between the inner vessel and said ring, thereby providing for the direct application of live steam to the upper portion of the inner vessel.

Novel features of construction and arrangement of parts will appear from the following description.

In the accompanying drawings, which are merely intended to illustrate a practical embodiment of the principles of my invention without limiting the scope of the latter to the construction shown, Figure 1 is a vertical section of a double boiler embodying the principles of my invention, the lid being shown in place, and Fig. 2 is a plan view of the outer vessel and the steam ring.

The following is a detailed description of the drawings.

A is the outer vessel which may be of the usual outer vessel construction, preferably provided with the usual beaded or rounded top 1 for supporting the steam ring B which is preferably made of metal and is in the form of an annulus having a contracted and downwardly tapered throat 2 in which seats the inner vessel C whose wall is also tapered to be supported in said throat 2. Above the throat 2 the ring B is outwardly flared forming an annular shoulder 3 approaching the horizontal and ending in upwardly extending collar 4 which extends above the top of the outer utensil A and has a top beaded edge 5 to receive the lid D which also preferably fits the top of the vessel A when the steam collar B and the inner utensil C are removed.

In the drawings the top edge of the ring B is shown as of slightly larger diameter than the top of the vessel A but in practice their diameters may be made equal, thus enabling the same lid D to be used for both purposes.

The shoulder 3 is provided with a plurality of steam ports or openings 6, so that steam from the steam chamber or interior of the outer vessel A passes freely up into the interior of the steam ring B, thus being directly applied to the upper perimetral wall of the inner vessel C. The top of the inner vessel C may be outwardly flared, as shown at 7, but is of sufficiently less diameter than the top of the steam ring to permit the entrance between the tops of the inner vessel and the steam ring, of the depending flange 8 of the lid D, thus closing the top of the annular steam chamber formed between the ring B and the vessel C.

I have shown the inner vessel C as made of heat-resisting glass, but it will of course be understood that metal or pottery may be used, if desired.

Any method of suspending the inner vessel intermediate of its height in the steam ring, which will permit the free circulation of the steam about the inner vessel within the steam ring, may be used. A number of variations from the method shown will suggest themselves to those familiar with the telescopic vessel art, but the same are within the scope of my invention, the method illustrated being cited only for the purpose of showing a convenient structure.

For convenience, the outer vessel is provided with the usual handle or handles 9; and the steam ring with a similar handle or handles 10, thus permitting the inner vessel to be lifted off with the steam ring.

It is evident from the foregoing that the steam generated in the outer vessel is directly applied throughout the entire perimetral wall of the inner vessel, thereby making possible and facilitating the complete and rapid cooking of the food contained in the inner vessel. Also it is possible to obtain a much greater water capacity in the outer vessel than is possible in the previous art, since the inner vessel does not need to project to such a great extent, as formerly, into the interior of the outer vessel.

What I desire to claim is:—

1. A cooking utensil comprising an outer vessel, a steam ring provided intermediate of its height with a circumferential shoulder whereby said steam ring may be mounted on said outer vessel with its portion below said shoulder depending within said outer vessel and its portion above said shoulder extending above said outer vessel, said lower portion being contracted, and an inner vessel supported by the engagement of its side wall intermediate of its height with the contracted lower portion of said steam ring whereby an annular chamber is formed between said steam ring and said inner vessel, ports being provided in the wall of said steam ring within the outer vessel whereby steam is admitted to said chamber from said outer vessel.

2. A cooking utensil comprising an outer vessel, a steam ring provided intermediate of its height with a circumferential shoulder whereby said steam ring may be mounted on said outer vessel with its portion below said shoulder depending within said outer vessel and its portion above said shoulder extending above said outer vessel, said lower portion being contracted, an inner vessel supported by the engagement of its side wall intermediate of its height with the contracted lower portion of said steam ring whereby an annular chamber is formed between said steam ring and said inner vessel, said steam ring being provided within said outer vessel with ports whereby steam is admitted to said chamber from said outer vessel, and a lid for said utensil fitting on top of said steam ring and provided with a depending annular portion interposed between said ring and said inner vessel.

Signed at Pittsburgh, Pa., this 10th day of Sept., 1920.

HENRY C. BIETTE.